United States Patent
Song et al.

(10) Patent No.: US 8,710,356 B2
(45) Date of Patent: Apr. 29, 2014

(54) PHOTOELECTRIC CONVERSION MODULE

(75) Inventors: Jung-Suk Song, Suwon-si (KR); Jeong-Jun Kim, Suwon-si (KR); Jung-Tae Park, Suwon-si (KR); Hyun-Chul Kim, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 236 days.

(21) Appl. No.: 12/972,096

(22) Filed: Dec. 17, 2010

(65) Prior Publication Data

US 2011/0259405 A1   Oct. 27, 2011

Related U.S. Application Data

(60) Provisional application No. 61/328,045, filed on Apr. 26, 2010.

(51) Int. Cl.
*H01L 31/00* (2006.01)

(52) U.S. Cl.
USPC .......................................................... 136/255

(58) Field of Classification Search
CPC . H01G 9/2022; H01G 9/2027; H01G 9/2068; H01G 9/2077; H01G 9/2081
USPC ......................................... 136/252, 255, 259
See application file for complete search history.

(56) References Cited

U.S. PATENT DOCUMENTS

| | | | |
|---|---|---|---|
| 6,376,765 B1 * | 4/2002 | Wariishi et al. | 136/263 |
| 7,476,607 B2 * | 1/2009 | Yamada et al. | 438/609 |
| 2006/0162770 A1 * | 7/2006 | Matsui et al. | 136/263 |
| 2007/0163645 A1 | 7/2007 | Gonda et al. | |
| 2008/0264482 A1 | 10/2008 | Lee et al. | |
| 2009/0133743 A1 | 5/2009 | Matsui | |
| 2011/0108104 A1 | 5/2011 | Kim et al. | |

FOREIGN PATENT DOCUMENTS

| | | | |
|---|---|---|---|
| CN | 1604250 A | * | 4/2005 |
| JP | 2001-256828 A | | 9/2001 |
| JP | 2002-319689 A | | 10/2002 |
| JP | 2003-203681 A | | 7/2003 |
| JP | 2005-078857 A | | 3/2005 |

(Continued)

OTHER PUBLICATIONS

KIPO Notice of Allowance (Korean only); issued Jan. 20, 2012 in corresponding KR-10-2010-0140655.

(Continued)

*Primary Examiner* — Eli Mekhlin
(74) *Attorney, Agent, or Firm* — Knobbe, Martens, Olson & Bear LLP

(57) ABSTRACT

A photoelectric conversion module, for example, a dye-sensitized solar cell, for generating electrical energy from light is disclosed. In one aspect, the module includes a light-receiving substrate, a first functional layer formed on the light receiving substrate and a first bus electrode formed on at least two edge regions of the light receiving substrate. The photoelectric conversion module may have a counter substrate having a second functional layer formed thereon and a second bus electrode formed on at least two edges of the counter substrate an electrolyte layer disposed between the first functional layer and the second functional layer. A first connection line may be electrically connected to the second bus electrode and a second connection line may be electrically connected to the first bus electrode is disclosed. Further, the first bus electrode may be electrically connected to the first functional layer and the second functional layer may be electrically connected to the second bus electrode.

16 Claims, 5 Drawing Sheets

(56) References Cited

FOREIGN PATENT DOCUMENTS

| | | |
|---|---|---|
| JP | 2005-124090 | 6/2005 |
| JP | 2005-142090 | 6/2005 |
| JP | 2005235715 A * | 9/2005 |
| JP | 2007-265796 A | 10/2007 |
| JP | 2008-0177022 A | 7/2008 |
| JP | 2008-0192376 A | 8/2008 |
| JP | 2010-040432 A | 2/2010 |
| KR | 10-2008-0049168 A | 6/2008 |
| KR | 10-1030014 B1 | 4/2011 |

OTHER PUBLICATIONS

JPO Office Action (Japanese only) issued Apr. 9, 2013 in related Japanese Application No. JP-2011-072260.

JPO Office Action (Japanese only) issued Aug. 20, 2013 in related Japanese Application No. JP-2011-072260.

* cited by examiner

PHOTOELECTRIC CONVERSION MODULE

CROSS-REFERENCE TO RELATED APPLICATIONS

This is a non-provisional application that claims priority to and the benefit of U.S. Provisional Application No. 61/328,045, filed Apr. 26, 2010, which is hereby incorporated by reference in its entirety.

BACKGROUND

1. Field of the Invention

This disclosure relates to a photoelectric conversion module, and more particularly, to a photoelectric conversion module including a current collecting unit formed along edges of a substrate.

2. Description of the Related Technology

Photoelectric conversion modules are used to convert light into electricity. Thus, a representative photoelectric conversion module is a solar cell for obtaining energy from sunlight. Generally, photoelectric conversion modules are made using wafer-type silicon or crystalline solar cells with p-n semiconductor junctions. Nevertheless, the costs of manufacturing silicon solar cells are high due to use of high purity semiconductor materials. Unlike silicon solar cells, dye-sensitized solar cells ("DSSCs") include a photosensitive dye that receives visual light wavelengths and generates excited electrons. The DSSCs also include a semiconductor material that receives the excited electrons and an electrolyte that reacts with electrons that return from an external circuit. The DSSCs have a much higher photoelectric conversion efficiency than silicon solar cells and thus are regarded as next-generation solar cells.

SUMMARY OF CERTAIN INVENTIVE ASPECTS

In one aspect, a photoelectric conversion module is capable of improving the efficiency of solar cells by including a current collecting unit that is formed along edges of a substrate and reduces an electron transfer resistance.

In another aspect, a photoelectric conversion module is capable of easily connecting a connection lines to a current collecting unit.

In another aspect, a photoelectric conversion module is capable of easily matching upper and lower substrates.

In another aspect, a photoelectric conversion module, includes, for example, a light-receiving substrate, a first functional layer formed on the light-receiving substrate, a first bus electrode formed on at least two edge regions of the light-receiving substrate, a counter substrate having a second functional layer formed thereon, a second bus electrode formed on at least two edges of the counter substrate, an electrolyte layer disposed between the first functional layer and the second functional layer, a first connection line electrically connected to the second bus electrode and a second connection line electrically connected to the first bus electrode.

In some embodiments, the first functional layer includes, for example, a photoelectrode formed on the light-receiving substrate, and a semiconductor layer formed on the photoelectrode. In some embodiments, a photosensitive dye is absorbed into the semiconductor layer. In some embodiments, the photoelectrode includes, for example, a first transparent conductive film formed on the light-receiving substrate, and a first grid formed on the first transparent conductive film. In some embodiments, a side wall of the first bus electrode is electrically connected to an end of the first grid. In some embodiments, a first protective layer is formed over at least a portion of the first grid. In some embodiments, the second functional layer includes, for example, a counter electrode formed on the counter substrate, and a catalyst layer formed on the counter electrode. In some embodiments, the counter electrode includes, for example, a second transparent conductive film formed on the counter substrate, and a second grid formed on the second transparent conductive film. In some embodiments, a side wall of the second bus electrode is electrically connected to an end of the second grid. In some embodiments, a second protective layer is formed over at least a portion of the second grid. In some embodiments, the photoelectric conversion module further includes, for example, a catalyst layer disposed between the second transparent film and the second grid. In some embodiments, the first connection line is disposed on a first region of the light-receiving substrate. In some embodiments, the first region corresponds to a portion formed on the light-receiving substrate, and the first connection line is disposed on the first region of the light-receiving substrate so as not to be electrically connected to the first bus electrode. In some embodiments, the first region corresponds to a space partially cut from the light-receiving substrate, and the first connection line is disposed on the first region of the light-receiving substrate so as not to be electrically connected to the first bus electrode. In some embodiments, the second connection line is disposed on a second region of the counter substrate. In some embodiments, the second region corresponds to a portion formed on the counter substrate, and the second connection line is disposed on the second region of the counter substrate so as not to be electrically connected to the second bus electrode. In some embodiments, the second region corresponds to a space partially cut from the counter substrate, and the second connection line is disposed on the second region of the counter substrate so as not to be electrically connected to the second bus electrode. In some embodiments, the second connection line electrically connects the photoelectric conversion module to a neighboring photoelectric cell or an external terminal. In some embodiments, the first connection line electrically connects the photoelectric conversion module to a neighboring photoelectric cell or an external terminal. In some embodiments, the first connection line and the second connection line are each formed as a spacer. In some embodiments, the semiconductor layer is formed of a metal compound. In some embodiments, the photosensitive dye is formed of ruthenium. In some embodiments, the first transparent conductive film is formed of a transparent conductive oxide. In some embodiments, the first grid is formed of a metal. In some embodiments, the first protective layer is formed of a curable resin. In some embodiments, the second protective layer is formed of a curable resin. In some embodiments, the catalyst layer is formed of a reduction material. In some embodiments, the catalyst layer is formed of any one of a metal, a metal oxide, and a carbon-based material. In some embodiments, the first grid includes a stripe pattern or island dot. In some embodiments, the first grid includes a cross-hatch pattern. In some embodiments, the first grid includes a stripe pattern or island dot as well as a cross-hatch pattern. In some embodiments, the second grid includes a cross-hatch pattern.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments may have several aspects, no single one of which necessarily is solely responsible for the desirable attributes of the apparatus, system or method. After considering this discussion, and particularly after reading the section entitled "Detailed Description of Certain Inventive Embodiments" one will understand how illustrated features serve to explain certain principles of the present disclosure.

DETAILED DESCRIPTION OF CERTAIN INVENTIVE EMBODIMENTS

Figure 1:
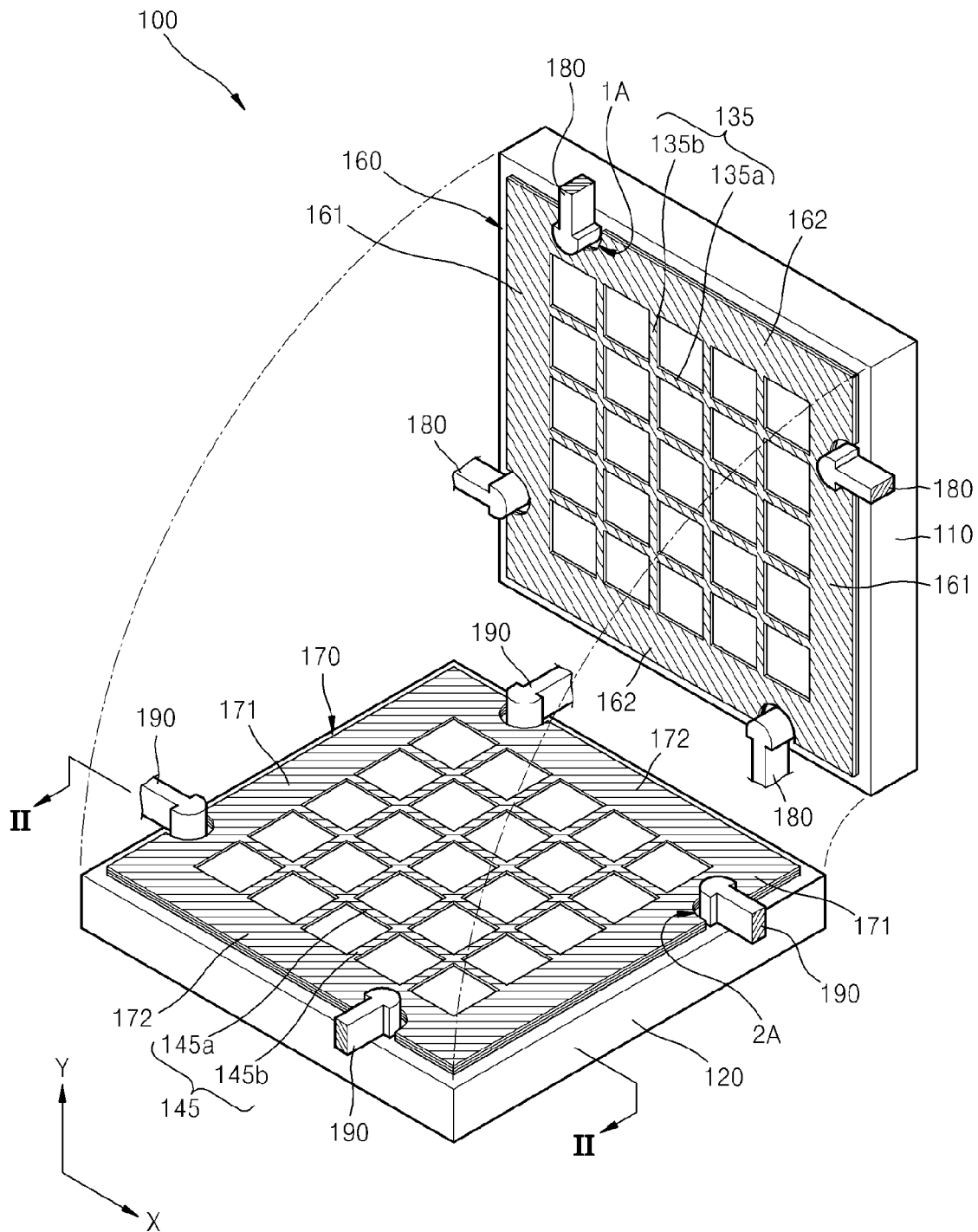
FIG. 1 is an exploded perspective view of a photoelectric conversion module according to one embodiment of the present disclosure.

In the following detailed description, only certain exemplary embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it may be directly on the other element or be indirectly on the other element with one or more intervening elements interposed therebetween. Also, when an element is referred to as being "connected to" another element, it may be directly connected to the other element or be indirectly connected to the other element with one or more intervening elements interposed therebetween. Hereinafter, like reference numerals refer to like elements. Certain embodiments will be described in more detail with reference to the accompanying drawings, so that a person having ordinary skill in the art may readily make and use aspects of the present disclosure.

Figure 2:
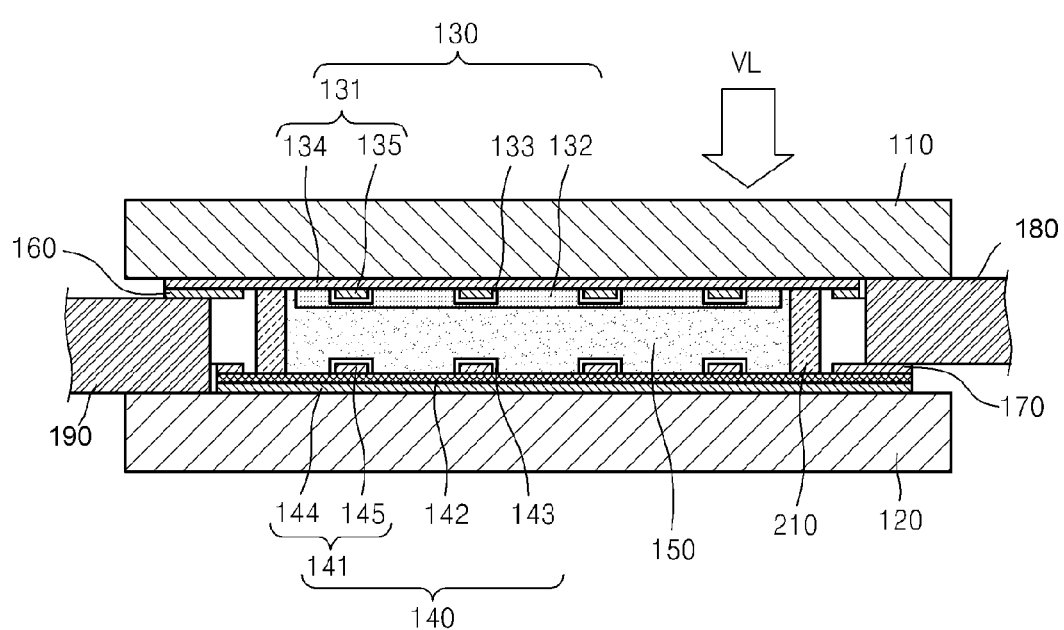
FIG. 2 is a combined cross-sectional view cut along a line II-II illustrated in FIG. 1.

FIG. 1 is an exploded perspective view of a photoelectric conversion module 100 according to one embodiment. FIG. 2 is a combined cross-sectional view cut along a line II-II of the photoelectric conversion module 100 illustrated in FIG. 1. Referring to FIGS. 1 and 2, the photoelectric conversion module 100 includes a light-receiving substrate 110 and a counter substrate 120 that face each other. First and second functional layers 130 and 140 configured to perform photoelectric conversion are respectively formed on the light-receiving substrate 110 and the counter substrate 120. The first functional layer 130 includes a photoelectrode 131 and a semiconductor layer 132. The second functional layer 140 includes a counter electrode 141 and a catalyst layer 142. An electrolyte layer 150 is formed between the first and second functional layers 130 and 140.

The light-receiving substrate 110 may be formed of a transparent material. The light-receiving substrate 110 may also be formed of a material having a high optical transmittance. For example, the light-receiving substrate 110 may be formed of glass or a resin film. Because a resin film is flexible, it may be appropriate for use in fabricating a flexible photoelectric conversion module.

The photoelectrode 131 includes a first transparent conductive film 134 formed on the light-receiving substrate 110, and a plurality of first grids 135 formed on the first transparent conductive film 134. The first transparent conductive film 134 may be formed of a transparent and an electrically conductive material. For example, the first transparent conductive film 134 may be formed of transparent conductive oxide ("TCO") such as indium tin oxide ("ITO"), fluorine tin oxide ("FTO") or antimony tin oxide ("ATO").

The first grids 135 are configured to reduce an electrical resistance of the first transparent conductive film 134. The first grids 135 include wirings configured for collecting electrons that are generated due to photoelectric conversion. Thus, the first grids 135 are configured to provide current paths having a low resistance. For example, the first grids 135 may be formed of a metallic material having an excellent electrical conductivity. Suitable metallic materials may include, for example, gold (Au), silver (Ag) or aluminum (Al). The first grids 135 illustrated in FIG. 1 have a mesh pattern, but one of ordinary skill would recognize that the present disclosure is not limited to any one pattern. In some embodiments, the first grid includes a stripe pattern or island dot. In some embodiments, the first grid includes a cross-hatch pattern. In some embodiments, the first grid includes a stripe pattern or island dot as well as a cross-hatch pattern. In some embodiments, the second grid includes a cross-hatch pattern.

The photoelectrode 131 may function as a negative electrode of the photoelectric conversion module 100 and may have a high aperture ratio. Incident light VL through the photoelectrode 131 may function as an excitation source for photosensitive dye absorbed in the semiconductor layer 132. Accordingly, increasing the amount of the incident light VL may improve photoelectric conversion efficiency.

First protective layers 133 may be formed on outer surfaces of the first grids 135. The first protective layers 133 are configured to prevent unintentional damage to electrodes by, for example, preventing the first grids 135 from contacting and reacting with the electrolyte layer 150 and thus becoming corroded. The first protective layers 133 may be formed of a material that does not react with the electrolyte layer 150. For example, the first protective layers 133 may be formed of a curable resin material.

The semiconductor layer 132 may be formed of a metallic compound, including, for example, cadmium (Cd), zinc (Zn), indium (In), lead (Pb), molybdenum (Mo), tungsten (W), antimony (Sb), titanium (Ti), silver (Ag), manganese (Mn), tin (Sn), zirconium (Zr), strontium (Sr), gallium (Ga), silicon (Si) or chromium (Cr). The particular photosensitive dye absorbed in the semiconductor layer 132 may also serve to increase photoelectric conversion efficiency. For example, the semiconductor layer 132 may be formed by coating a paste on the light-receiving substrate 110 on which the photoelectrode 131 is formed, and heating or pressing the paste by applying a certain degree of heat or pressure. The paste may include, for example, dispersed semiconductor particles having diameters of between about 5 nm to about 1000 nm, The semiconductor layer 132 is configured to absorb the photosensitive dye, which is excited by incidence of the light VL. Thus, the photosensitive dye absorbed in the semiconductor layer 132 will absorb the light VL incident through the light-receiving substrate 110. Electrons of the photosensitive dye are then excited from a ground state to an excitation state. The excited electrons are transferred to a conduction band of the semiconductor layer 132 by an electrical contact between the photosensitive dye and the semiconductor layer 132. The electrons thus reach the photoelectrode 131 via the semiconductor layer 132 and are output via the photoelectrode 131 to form a driving current configured for driving an external circuit.

The photosensitive dye absorbed by the semiconductor layer 132 may include molecules that absorb visual light and cause a rapid transfer of electrons to the semiconductor layer 132 in an optical excitation state. The photosensitive dye may be in the form of a liquid, a semi-solid gel or a solid. For example, the photosensitive dye absorbed in the semiconductor layer 132 may be a ruthenium (Ru)-based photosensitive dye. The photosensitive dye may be absorbed into the semiconductor layer 132 by dipping the light-receiving substrate 110 on which the semiconductor layer 132 is formed into a solution containing the photosensitive dye.

The counter substrate 120 facing the light-receiving substrate 110 need not be transparent. However, the counter substrate 120 may be formed of a transparent material. For example, the counter substrate 120 may be formed of the same material as the light-receiving substrate 110. In this case, the light VL would be received from both sides of the device, and thus, the photoelectric conversion efficiency would be improved.

The counter electrode 141 includes a second transparent conductive film 144 formed on the counter substrate 120. The counter electrode 141 also includes a plurality of second grids 145 formed on the second transparent conductive film 144 by forming the catalyst layer 142 therebetween. Alternatively, the second grids 145 may be formed directly on the second transparent conductive film 144. Second protective layers 143 may be formed on outer surfaces of the second grids 145. The second transparent conductive film 144 is formed of a transparent and electrically conductive material. For example, the second transparent conductive film 144 may be formed of TCO, such as ITO, FTO or ATO.

The counter electrode 141 may be configured to function as a positive electrode of the photoelectric conversion module 100, and configured to perform the function of a reduction catalyst for providing electrons to the electrolyte layer 150. In operation, the photosensitive dye absorbed in the semiconductor layer 132 is excited by absorbing the light VL and the excited electrons are output via the photoelectrode 131. Meanwhile, the photosensitive dye that loses the electrons is reduced by collecting electrons provided when the electrolyte layer 150 is oxidized, and the oxidized electrolyte layer 150 is reduced due to the electrons that reach the counter electrode 141 via the external circuit, thereby completing an operation of the photoelectric conversion module 100.

The catalyst layer 142 is formed of a reduction catalyst material for providing electrons to the electrolyte layer 150. For example, the catalyst layer 142 may be formed of a metal such as platinum (Pt), gold (Au), silver (Ag), copper (Cu) or aluminum (Al), metal oxide such as tin oxide (SnO), or a carbon (C)-based material such as graphite. The electrolyte layer 150 may be formed of a redox electrolyte including an oxidizing agent and a reducing agent. The electrolyte layer 150 may be in the form of a solid, a gel, or a liquid.

Meanwhile, a sealant 210 is formed around the electrolyte layer 150. The sealant 210 is configured to seal the electrolyte layer 150 such that the electrolyte portion of the electrolyte layer 150 does not leak, and further is configured to define a photoelectric conversion region inside the photoelectric conversion module 100 from an external region.

Here, a current collecting unit configured for minimizing electron transfer paths is formed to prevent insufficient transfer of electrons, which is caused by a great reduction in the photoelectric conversion efficiency as the photoelectric conversion module 100 is getting larger.

In more detail, a first bus electrode 160, which is electrically connected to the first grids 135, is formed on at least two edge regions of the light-receiving substrate 110. A second bus electrode 170, which is electrically connected to the second grids 145, is formed on at least two edge regions of the counter substrate 120. The first and second bus electrodes 160 and 170 are configured to function as current collecting electrodes.

Furthermore, first regions 1A represent edges of the light-receiving substrate 110, on which first connection lines 180 are disposed. The first connection lines 180 are not electrically connected to the first bus electrode 160, but instead, are configured to be electrically connected to the second bus electrode 170. Second regions 2A represent edges of the counter substrate 120, on which second connection lines 190 are disposed. The second connection lines 190 are not electrically connected to the second bus electrode 170, but instead, are configured to be electrically connected to the first bus electrode 160.

Connections between the first bus electrodes 160 and second connection lines 190 and connections between the second bus electrodes 170 and the first connection lines 180, will now be described in further detail. The first transparent conductive film 134 is patterned on a surface of the light-receiving substrate 110, which faces the counter substrate 120. The first transparent conductive film 134 is formed on the entire surface of the light-receiving substrate 110. The first grids 135 are patterned on the first transparent conductive film 134. In this embodiment, the first grids 135 have a mash pattern. The first grids 135 may include first portions 135a, which extend in an X direction and which separate from each other by a distance in a Y direction, and second portions 135b, which extend in the Y direction to cross the first portions 135a, and which separate from each other by a distance in the X direction.

The first bus electrode 160, which is electrically connected to the first grids 135, is formed on edges of the light-receiving substrate 110. The first bus electrode 160 includes first portions 161 formed on two X-direction edges of the light-receiving substrate 110 and second portions 162 formed on two Y-direction edges of the light-receiving substrate 100. The first portions 161 of the first bus electrode 160 are electrically connected to the first portions 135a of the first grids 135 and the second portions 162 of the first bus electrode 160 are electrically connected to the second portions 135b of the first grids 135. Although the first bus electrode 160 is formed on four edge regions of the light-receiving substrate 110 in FIG. 1, the current embodiment is not limited thereto as long as the first bus electrode 160 is formed on at least two edge regions of the light-receiving substrate 110.

The second grids 145 are patterned on the counter substrate 120. In some embodiments, the second grids 145 have a mesh pattern. The second grids 145 include first portions 145a, which extend in the X direction and which separate from each other by a distance in the Y direction. The second grids 145 also include second portions 145b, which extend in the Y direction to cross the first portions 145a, and which separate from each other by a distance in the X direction.

The second bus electrode 170, which is electrically connected to the second grids 145, is formed on edges of the counter substrate 120. The second bus electrode 170 includes first portions 171 formed on two X-direction edges of the counter substrate 120 and second portions 172 formed on two Y-direction edges of the counter substrate 120. The first portions 171 of the second bus electrode 170 are electrically connected to the first portions 145a of the second grids 145 and the second portions 172 of the second bus electrode 170 are electrically connected to the second portions 145b of the second grids 145. Although the second bus electrode 170 is formed on four edge regions of the counter substrate 120 in FIG. 1, embodiments of the present disclosure are not limited thereto. In general, however, the second bus electrode 170 is formed on at least two edge regions of the counter substrate 120.

Figure 3:
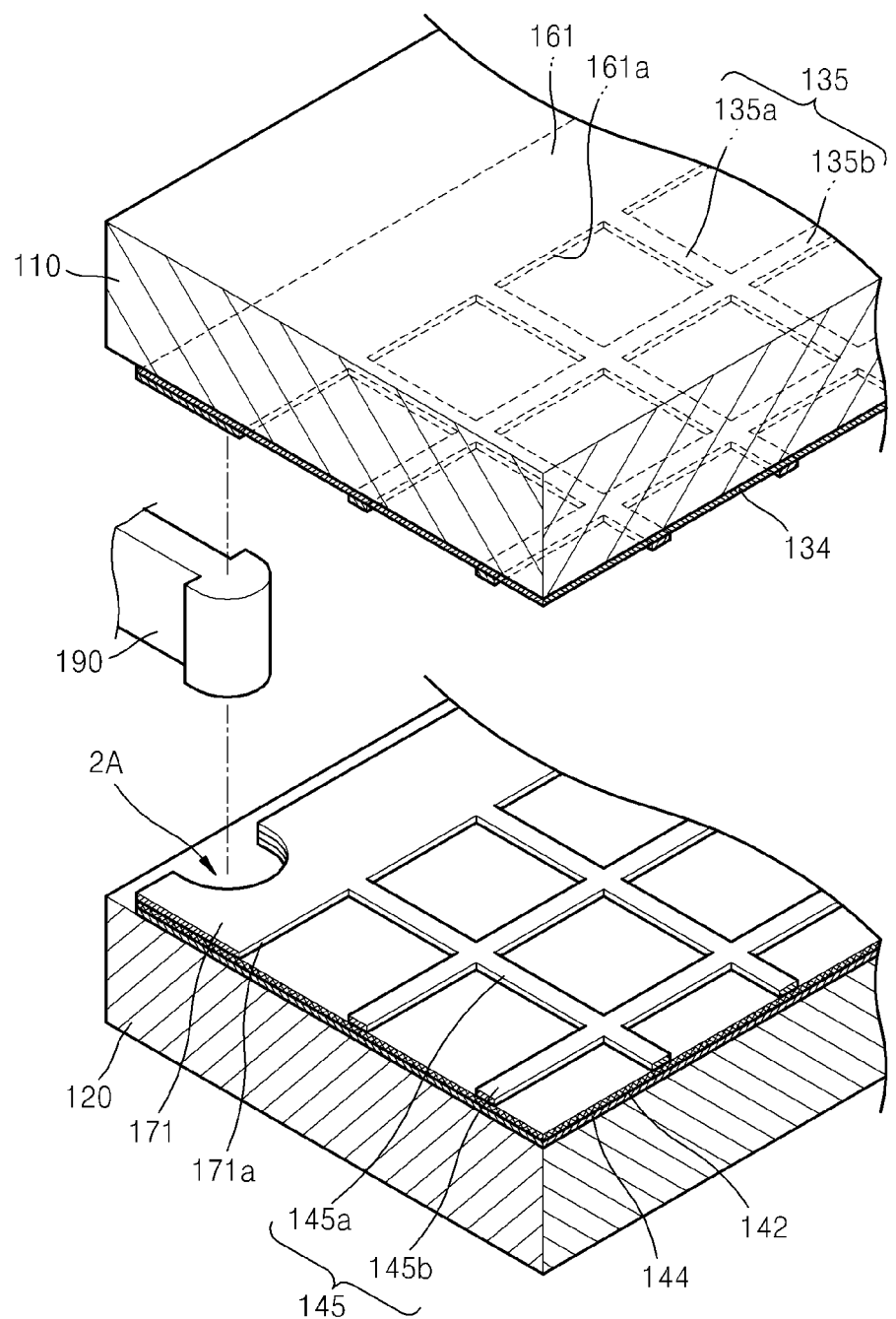
FIG. 3 is an enlarged partial perspective view of the photoelectric conversion module illustrated in FIG. 1.

FIG. 3 is an enlarged partial perspective view of the photoelectric conversion module 100 illustrated in FIG. 1. Electrical connection between the first bus electrode 160 and the second connection lines 190 will now be described with reference to FIG. 3, and the same connection may be used between the second bus electrode 170 and the first connection lines 180. Referring to FIG. 3, a side wall 161a of a first portion 161 of the first bus electrode 160 may be electrically connected to ends of the first portions 135a of the first grids 135. The first portion 161 of the first bus electrode 160 may be electrically connected to the first portions 135a of the first grids 135 and functions as a common current collecting unit.

A side wall 171a of a first portion 171 of the second bus electrode 170 is electrically connected to ends of the first portions 145a of the second grids 145. The first portion 171 of the second bus electrode 170 is electrically connected to the first portions 145a of the second grids 145 and functions as a common current collecting unit. The first portion 171 of the second bus electrode 170 has a stripe shape. In this case, a second region 2A on which the second bus electrode 170 is not formed is formed in a partial region of the first portion 171 of the second bus electrode 170. The second region 2A may be formed in a semicircular shape by removing a partial region of the first portion 171 of the second bus electrode 170. The shape of the second region 2A is not limited to a particular shape as long as a partial region of the first portion 171 of the second bus electrode 170 is removed to form an empty space.

A second connection line 190 is disposed on the second region 2A. The second connection line 190 is not electrically connected to the first portion 171 of the second bus electrode 170. On the other hand, when the light-receiving substrate 110 and the counter substrate 120 are combined, the second connection line 190 is electrically connected to the first portion 161 of the first bus electrode 160, which overlaps the second connection line 190. The second connection line 190 may be formed of a conductive material, such as copper (Cu), and may electrically connect the photoelectric conversion module 100 to a neighboring cell or an external terminal.

As described above, a patterned bus electrode of either the light-receiving substrate 110 or the counter substrate 120 is not formed on a partial region. Instead, a connection line electrically connected to a patterned bus electrode of the other of the light-receiving substrate 110 and the counter substrate 120 is disposed on the partial region. Also, the connection line is disposed between the light-receiving substrate 110 and the counter substrate 120 and may be configured to function as a spacer for maintaining a space between the light-receiving substrate 110 and the counter substrate 120. Furthermore, except for a partial region of a patterned bus electrode, which is electrically connected to a connection line, the bus electrode may be covered by a protective layer. As such, a short may be prevented.

Figure 4:
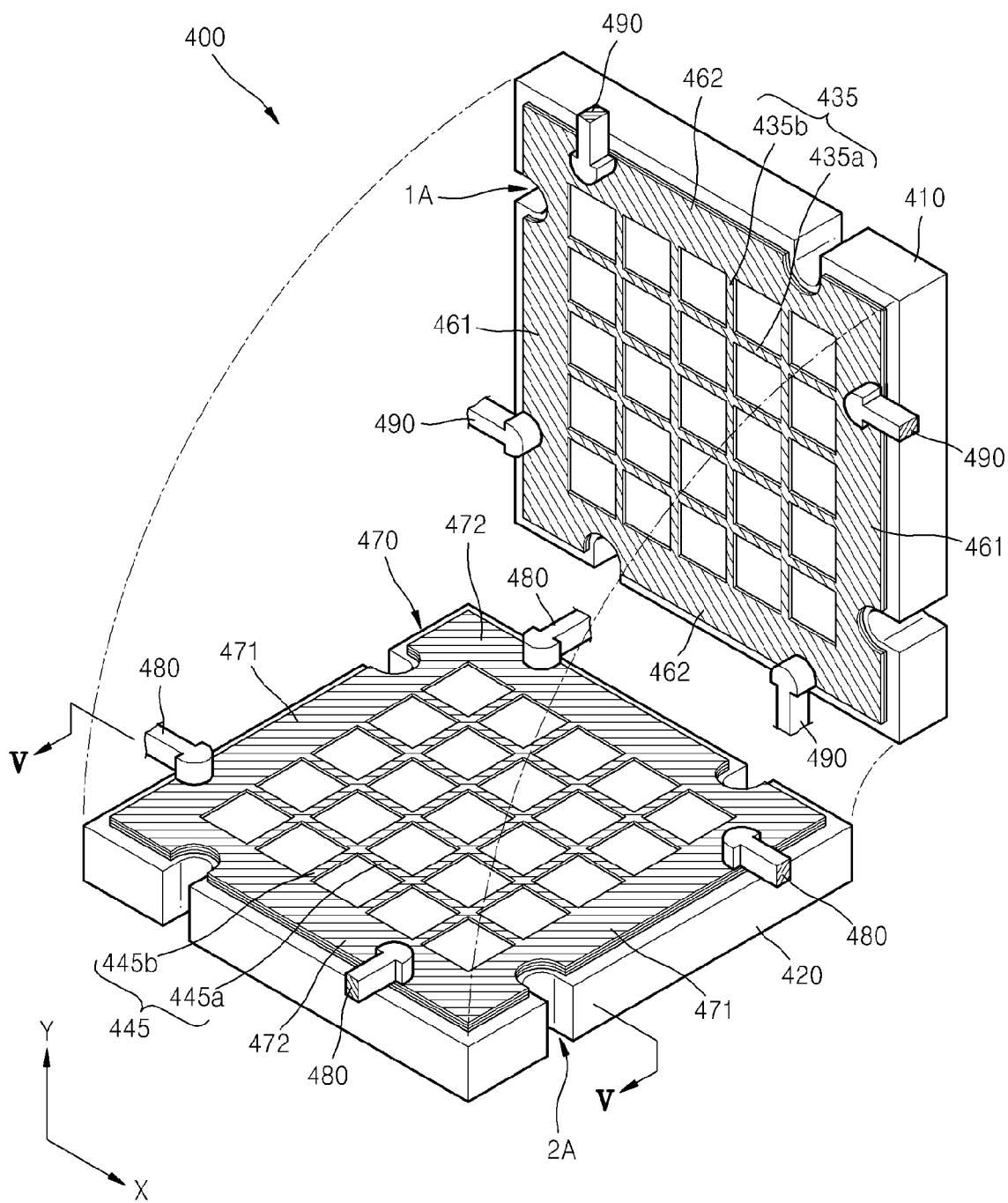
FIG. 4 is an exploded perspective view of a photoelectric conversion module according to another embodiment of the present disclosure.
Figure 5:
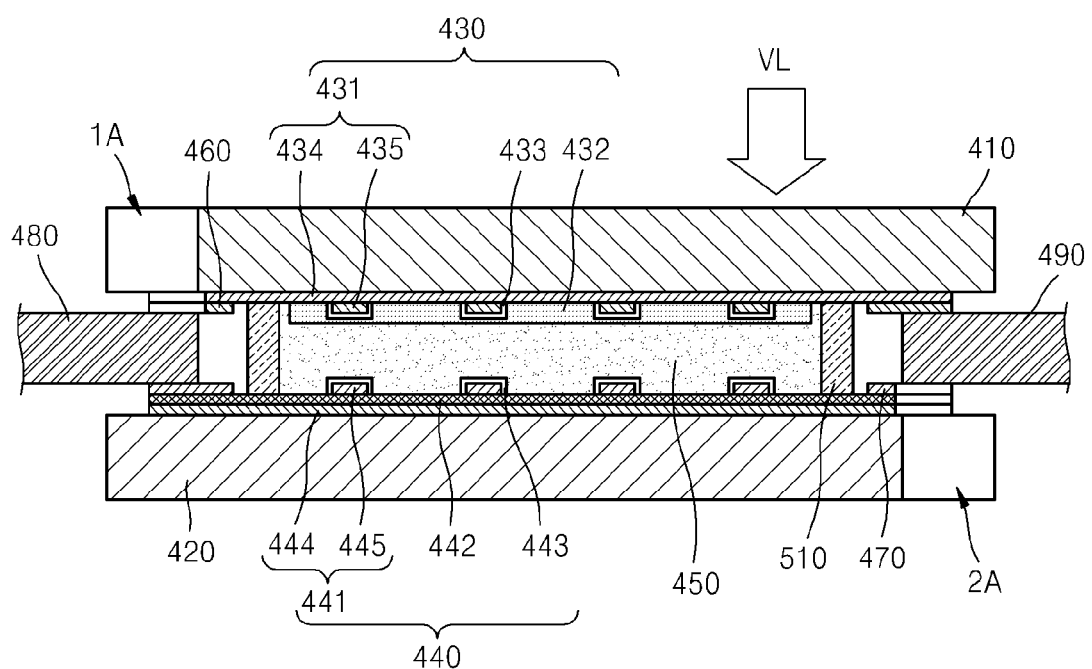
FIG. 5 is a combined cross-sectional view cut along a line V-V illustrated in FIG. 4.

FIG. 4 is an exploded perspective view of a photoelectric conversion module 400 according to another embodiment. FIG. 5 is a combined cross-sectional view cut along a line V-V illustrated in FIG. 4. Referring to FIGS. 4 and 5, the photoelectric conversion module 400 includes a light-receiving substrate 410 and a counter substrate 420, which face each other. First and second functional layers 430 and 440 are respectively formed on the light-receiving substrate 410 and the counter substrate 420. The first functional layer 430 includes a photoelectrode 431 and a semiconductor layer 432. The second functional layer 440 includes a counter electrode 441 and a catalyst layer 442.

An electrolyte layer 450 is formed between the first and second functional layers 430 and 440. A sealant 510 is formed around the electrolyte layer 450, and defines a photoelectric conversion region inside the photoelectric conversion module 400 from an external region. The photoelectrode 431 includes a first transparent conductive film 434 formed on the light-receiving substrate 410, and a plurality of first grids 435 formed on the first transparent conductive film 434. First protective layers 433 may be formed on outer surfaces of the first grids 435.

The counter electrode 441 includes a second transparent conductive film 444 formed on the counter substrate 420, and a plurality of second grids 445 formed on the second transparent conductive film 444 by forming the catalyst layer 442 therebetween. Alternatively, the second grids 445 may be formed directly on the second transparent conductive film 444. Second protective layers 443 may be formed on outer surfaces of the second grids 445. In this case, a first bus electrode 460, which is electrically connected to the first grids 435, is formed on at least two edge regions of the light-receiving substrate 410. A second bus electrode 470, which is electrically connected to the second grids 445, is formed on at least two edge regions of the counter substrate 420.

In the embodiment of FIG. 4, the first grids 435 have a mash pattern. The first grids 435 include first portions 435a, which extend in an X direction and which separate from each other by a distance in a Y direction, and second portions 435b, which extend in the Y direction to cross the first portions 435a, and which separate from each other by a distance in the X direction.

The first bus electrode 460 includes first portions 461 formed on two X-direction edges of the light-receiving substrate 410, and second portions 462 formed on two Y-direction edges of the light-receiving substrate 400. The first portions 461 of the first bus electrode 460 are electrically connected to the first portions 435a of the first grids 435, and the second portions 462 of the first bus electrode 460 are electrically connected to the second portions 435b of the first grids 435.

In the embodiment of FIG. 4, the second grids 445 have a mesh pattern. The second grids 445 include first portions 445a, which extend in the X direction and which separate from each other by a distance in the Y direction, and second portions 445b, which extend in the Y direction to cross the first portions 445a, and which separate from each other by a distance in the X direction.

The second bus electrode 470 includes first portions 471 formed on two X-direction edges of the counter substrate 420, and second portions 472 formed on two Y-direction edges of the counter substrate 420. The first portions 471 of the second bus electrode 470 are electrically connected to the first portions 445a of the second grids 445, and the second portions 472 of the second bus electrode 470 are electrically connected to the second portions 445b of the second grids 445.

First regions 1A represent edges of the light-receiving substrate 410 on which first connection lines 480 are disposed. The first connection lines 480 are not electrically connected to the first bus electrode 460, but instead, are configured to be electrically connected to the second bus electrode 470. The first regions 1A are formed by removing partial regions of the light-receiving substrate 410 in a thickness direction. As illustrated in FIG. 4, the first regions 1A have a semicircular shape with respect to their horizontal cross-sections, but first regions 1A are not limited to a particular shape as long as the first connection lines 480 are electrically connected to the second bus electrode 470. Also, the first bus electrode 460 is not formed on partial regions of the first bus electrode 460, which overlap the first regions 1A.

Second regions 2A represent edges of the counter substrate 420 on which second connection lines 490 are disposed. The second connection lines 490 are not electrically connected to the second bus electrode 470, but instead are configured to be electrically connected to the first bus electrode 460. The second regions 2A are formed by removing partial regions of the counter substrate 420 in a thickness direction. As illustrated in FIG. 4, the second regions 2A have a semicircular shape with respect to their horizontal cross-sections, but second regions 2A are not limited to a particular shape as long as the second connection lines 490 are electrically connected to the first bus electrode 460. Also, the second bus electrode 470 is not formed on partial regions of the second bus electrode 470, which overlap the second regions 2A.

As described above, the first regions 1A are formed by removing partial regions of the light-receiving substrate 410 in a thickness direction and the first connection lines 480 are disposed in the first regions 1A. The first connection lines 480 are not electrically connected to the first bus electrode 460, but are electrically connected to the second bus electrode 470. Furthermore, the second regions 2A are formed by removing partial regions of the counter substrate 420 in a thickness direction and the second connection lines 490 are disposed in the second regions 2A. The second connection lines 490 are not electrically connected to the second bus electrode 470 but are electrically connected to the first bus electrode 460.

While the present invention has been described in connection with certain exemplary embodiments, it will be appreciated by those skilled in the art that various modifications and changes may be made without departing from the scope of the present disclosure. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity. Thus, while this invention has been described in connection with what is presently considered to be some exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A photoelectric conversion module, comprising:
    a light-receiving substrate;
    a first functional layer formed on the light-receiving substrate;
    a first bus electrode formed on at least two edge regions of the light-receiving substrate, wherein the first bus electrode is electrically connected to the first functional layer;
    a counter substrate having a second functional layer formed thereon;
    a second bus electrode formed on at least two edges of the counter substrate, wherein the second functional layer is electrically connected to the second bus electrode;
    an electrolyte layer disposed between the first functional layer and the second functional layer;
    a first connection line electrically connected to the second bus electrode, wherein the first connection line is disposed on the light-receiving substrate and is not directly electrically connected to the first bus electrode; and
    a second connection line electrically connected to the first bus electrode, wherein the second connection line is disposed on the counter substrate and is not directly electrically connected to the second bus electrode.

2. The photoelectric conversion module of claim 1, wherein the first functional layer comprises a photoelectrode formed on the light-receiving substrate, and a semiconductor layer formed on the photoelectrode.

3. The photoelectric conversion module of claim 2, wherein a photosensitive dye is absorbed into the semiconductor layer.

4. The photoelectric conversion module of claim 2, wherein the photoelectrode comprises a first transparent conductive film formed on the light-receiving substrate, and a first grid formed on the first transparent conductive film.

5. The photoelectric conversion module of claim 4, wherein a side wall of the first bus electrode is electrically connected to an end of the first grid, and wherein the first grid comprises a stripe pattern or a cross-hatch pattern.

6. The photoelectric conversion module of claim 4, wherein a first protective layer is formed over at least a portion of the first grid.

7. The photoelectric conversion module of claim 4, wherein the second functional layer comprises a counter electrode formed on the counter substrate, and a catalyst layer formed on the counter electrode.

8. The photoelectric conversion module of claim 7, wherein the counter electrode comprises a second transparent conductive film formed on the counter substrate, and a second grid formed on the second transparent conductive film.

9. The photoelectric conversion module of claim 8, wherein a side wall of the second bus electrode is electrically connected to an end of the second grid.

10. The photoelectric conversion module of claim 8, wherein a second protective layer is formed over at least a portion of the second grid, and wherein the second grid comprises a cross-hatch pattern.

11. The photoelectric conversion module of claim 8, wherein the catalyst layer is disposed between the second transparent film and the second grid.

12. The photoelectric conversion module of claim 1, wherein the first connection line is disposed in a space partially cut from the light-receiving substrate so as not to contact the first bus electrode.

13. The photoelectric conversion module of claim 1, wherein the second connection line is disposed in a space partially cut from the counter substrate so as not to contact the second bus electrode.

14. The photoelectric conversion module of claim 1, wherein the second connection line electrically connects the photoelectric conversion module to a neighboring photoelectric cell or an external terminal.

15. The photoelectric conversion module of claim 1, wherein the first connection line electrically connects the photoelectric conversion module to a neighboring photoelectric cell or an external terminal.

16. The photoelectric conversion module of claim 1, wherein the first connection line and the second connection line are each formed as a spacer.

* * * * *